United States Patent
Tanaka et al.

(10) Patent No.: US 12,460,860 B2
(45) Date of Patent: Nov. 4, 2025

(54) COLD ENERGY RECOVERY FACILITY AND MARINE VESSEL

(71) Applicant: MITSUBISHI HEAVY INDUSTRIES, LTD., Tokyo (JP)

(72) Inventors: Toshimitsu Tanaka, Tokyo (JP); Ryo Takata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 325 days.

(21) Appl. No.: 18/107,345

(22) Filed: Feb. 8, 2023

(65) Prior Publication Data
US 2023/0251031 A1 Aug. 10, 2023

(30) Foreign Application Priority Data
Feb. 9, 2022 (JP) ................................ 2022-018348

(51) Int. Cl.
*F25J 1/00* (2006.01)
*B63B 25/16* (2006.01)

(52) U.S. Cl.
CPC ............ *F25J 1/001* (2013.01); *B63B 25/16* (2013.01); *F25J 1/005* (2013.01); *F25J 2270/16* (2013.01); *F25J 2290/70* (2013.01)

(58) Field of Classification Search
CPC ... B63B 25/16; F25J 1/001; F25J 1/005; F25J 2270/16; F25J 2290/70
See application file for complete search history.

(56) References Cited

U.S. PATENT DOCUMENTS 5,473,900 A * 12/1995 Low ................ F25J 1/0207
62/611
6,112,528 A * 9/2000 Rigby ................ F17C 7/04
62/48.1

(Continued)

FOREIGN PATENT DOCUMENTS

| CN | 204572093 U | 8/2015 |
| EP | 4 035 985 A1 | 8/2022 |

(Continued)

OTHER PUBLICATIONS

Extended European Search Report for European Application No. 23155522.8, dated Jul. 6, 2023.

(Continued)

*Primary Examiner* — Filip Zec
(74) *Attorney, Agent, or Firm* — BIRCH, STEWART, KOLASCH & BIRCH, LLP

(57) ABSTRACT

A cold energy recovery facility includes a liquid hydrogen tank configured to store liquid hydrogen a first circuit configured to circulate a first working medium, a second circuit configured to circulate a second working medium having a freezing point higher than the first working medium, a first turboexpander provided in the first circuit, the first turboexpander being configured to be driven by the first working medium in a gas state, a second turboexpander provided in the second circuit, the second turboexpander being configured to be driven by the second working medium in a gas state, a first heat exchanger configured to vaporize the liquid hydrogen from the liquid hydrogen tank by heat exchange with the first working medium, a second heat exchanger configured to vaporize the first working medium in a liquid state by heat exchange with the second working medium, and a third heat exchanger configured to vaporize the second working medium in a liquid state by heat exchange with a heat medium, wherein the first circuit (Continued)

and the first turboexpander form a part of a first thermodynamic cycle that uses the liquid hydrogen as a low-temperature heat source in the first heat exchanger, and the second circuit and the second turboexpander form a part of a second thermodynamic cycle that uses the first working medium as a low-temperature heat source in the second heat exchanger.

14 Claims, 11 Drawing Sheets

(56) References Cited

U.S. PATENT DOCUMENTS

| | | | | |
|---|---|---|---|---|
| 8,256,230 | B2* | 9/2012 | An | F25J 1/0045 |
| | | | | 62/48.2 |
| 9,309,810 | B2* | 4/2016 | Foege | F02C 7/22 |
| 10,502,484 | B2* | 12/2019 | Huntington | F25J 1/0216 |
| 10,655,911 | B2* | 5/2020 | Turner | F25J 1/0204 |
| 10,955,090 | B2* | 3/2021 | Riley | F17C 9/04 |
| 11,083,109 | B2* | 8/2021 | Mao | F24F 5/0035 |
| 11,946,006 | B2* | 4/2024 | Foody | C12M 47/18 |
| 2013/0160486 | A1* | 6/2013 | Amir | F01K 25/10 |
| | | | | 62/611 |
| 2013/0291567 | A1* | 11/2013 | Bohra | F17C 5/06 |
| | | | | 62/48.1 |
| 2014/0260253 | A1* | 9/2014 | Oney | F01K 25/065 |
| | | | | 60/660 |
| 2015/0013379 | A1* | 1/2015 | Oelfke | F25J 1/0217 |
| | | | | 62/612 |
| 2016/0230711 | A1* | 8/2016 | Huntington | F02C 9/16 |
| 2016/0238312 | A1* | 8/2016 | Kakutani | F25J 1/0055 |
| 2016/0281932 | A1* | 9/2016 | Karlsson | F02M 37/007 |
| 2017/0038008 | A1 | 2/2017 | Tada | |
| 2017/0167787 | A1* | 6/2017 | Pierre, Jr. | F25J 1/0277 |

FOREIGN PATENT DOCUMENTS

| | | |
|---|---|---|
| FR | 3 099 205 A1 | 1/2021 |
| JP | 2006-264568 A | 10/2006 |
| JP | 2010-267707 A | 11/2010 |
| JP | 2015-155787 A | 8/2015 |
| JP | 2015-178788 A | 10/2015 |
| JP | 2020-147221 A | 9/2020 |
| JP | 2021-85443 A | 6/2021 |
| JP | 2022-39507 A | 3/2022 |
| WO | WO2021/019147 A1 | 2/2021 |
| WO | WO 2021/106984 A1 | 6/2021 |

OTHER PUBLICATIONS

Japanese Office Action for Japanese Application No. 2022-018348, dated Jul. 15, 2025, with English translation.

* cited by examiner

COLD ENERGY RECOVERY FACILITY AND MARINE VESSEL

CROSS-REFERENCE TO RELATED APPLICATIONS

This application claims the benefit of priority to Japanese Patent Application Number 2022-018348 filed on Feb. 9, 2022. The entire contents of the above-identified application are hereby incorporated by reference.

TECHNICAL FIELD

The disclosure relates to a cold energy recovery facility and a marine vessel.

RELATED ART

Methods for recovering and effectively using cold energy of a low-temperature liquid such as liquefied natural gas (LNG) have been proposed.

JP 2020-147221 A describes a floating facility provided with a power generation device that generates power using LNG cold energy. This power generation device includes a thermodynamic cycle that uses a heat medium as a working fluid, and generates power using a generator connected to a turboexpander driven by the heat medium (working fluid) flowing through a circuit. In the thermodynamic cycle, engine cooling water, seawater, or the like is used as a high-temperature heat source that exchanges heat with the heat medium in an evaporator, and LNG is used as a low-temperature heat source that exchanges heat with the heat medium in a condenser. The LNG is vaporized (regasified) in the condenser, and then supplied to a device or the like that uses the regasified LNG as fuel.

SUMMARY

The use of liquid hydrogen (LH2) as fuel for a marine vessel or the like has been proposed. The storage temperature of liquid hydrogen is approximately −253° C., which is lower than the storage temperature of LNG (approximately −163° C.). For this reason, when liquid hydrogen is used instead of LNG in a device including a thermodynamic cycle that recovers and utilizes LNG cold energy, a fluid (a working fluid, a fluid used as a high-temperature heat source, or the like) flowing through a heat exchanger (a condenser, an evaporator, or the like) may become colder and frozen, and the thermodynamic cycle may not work properly.

In light of the above circumstances, an object of at least one embodiment of the disclosure is to provide a cold energy recovery facility and a marine vessel capable of suppressing freezing of a fluid flowing through a heat exchanger while recovering cold energy of liquid hydrogen.

A cold energy recovery facility according to at least an embodiment of the disclosure includes:
  a liquid hydrogen tank configured to store liquid hydrogen,
  a first circuit configured to circulate a first working medium,
  a second circuit configured to circulate a second working medium having a freezing point higher than the first working medium,
  a first turboexpander provided in the first circuit, the first turboexpander being configured to be driven by the first working medium in a gas state,
  a second turboexpander provided in the second circuit, the second turboexpander being configured to be driven by the second working medium in a gas state,
  a first heat exchanger configured to vaporize the liquid hydrogen from the liquid hydrogen tank by heat exchange with the first working medium,
  a second heat exchanger configured to vaporize the first working medium in a liquid state by heat exchange with the second working medium, and
  a third heat exchanger configured to vaporize the second working medium in a liquid state by heat exchange with a heat medium, wherein
  the first circuit and the first turboexpander form a part of a first thermodynamic cycle that uses the liquid hydrogen as a low-temperature heat source in the first heat exchanger, and
  the second circuit and the second turboexpander form a part of a second thermodynamic cycle that uses the first working medium as a low-temperature heat source in the second heat exchanger.

Additionally, a marine vessel according to at least an embodiment of the disclosure includes a ship, the cold energy recovery facility described above provided at the ship, and an engine or a fuel cell provided at the ship, the engine or the fuel cell using, as fuel, the hydrogen vaporized in the first heat exchanger.

According to at least an embodiment of the disclosure, provided are a cold energy recovery facility and a marine vessel capable of suppressing freezing of a fluid flowing through a heat exchanger while recovering cold energy of liquid hydrogen.

BRIEF DESCRIPTION OF DRAWINGS

The disclosure will be described with reference to the accompanying drawings, wherein like numbers reference like elements.

DESCRIPTION OF EMBODIMENTS

Figure 1:
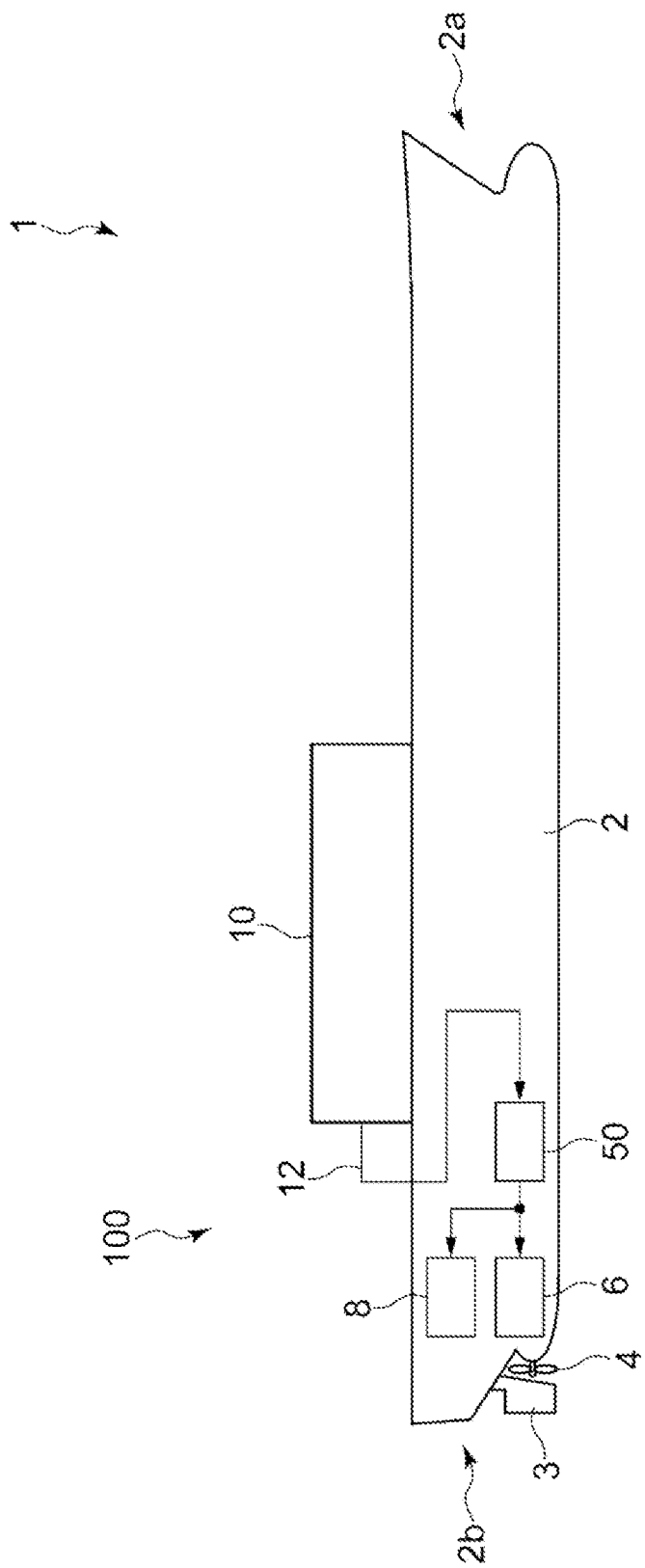
FIG. 1 is a schematic diagram of a marine vessel according to an embodiment.
Figure 2:
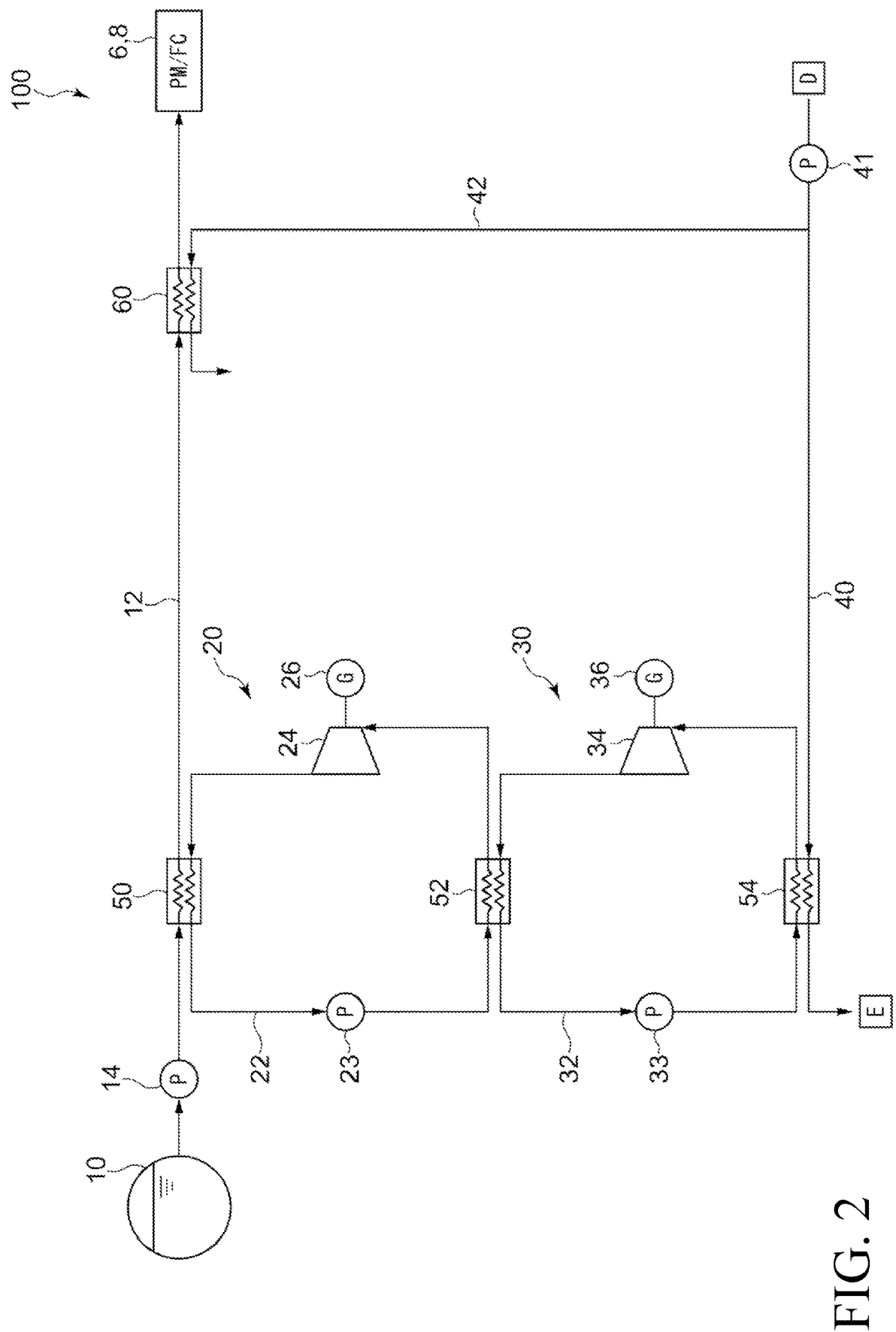
FIG. 2 is a schematic diagram of a cold energy recovery facility according to an embodiment.

Some embodiments of the disclosure will be described below with reference to the attached drawings. It is intended, however, that dimensions, materials, shapes, relative arrangements or the like of components described in the embodiments or illustrated in the drawings are only examples and not intended to limit the scope of the disclosure to them.

Configuration of Marine Vessel

FIG. 1 is a schematic diagram of a marine vessel to which a cold energy recovery facility according to some embodiments is applied. As illustrated in FIG. 1, a marine vessel 1 includes a ship 2 (floating body), a cold energy recovery facility 100 including a liquid hydrogen tank 10 provided on the ship 2, and an engine 6 provided in the ship 2.

The ship 2 includes a bow 2a having a shape that reduces the resistance that the ship 2 receives from a fluid such as seawater, and a stern 2b to which a rudder 3 for adjusting the traveling direction of the ship 2 can be attached.

The engine 6 may be configured to generate power for driving a propeller 4 serving as a propulsor. The engine 6 may include an engine or a turbine, or may include an electric motor.

As illustrated in FIG. 1, the marine vessel 1 may be provided with a fuel cell 8. The electric motor serving as the engine 6 may be driven by power generated by the fuel cell 8.

In the exemplary embodiment illustrated in FIG. 1, the marine vessel 1 is a marine vessel propelled using hydrogen stored in the liquid hydrogen tank 10 as fuel. As described in detail below, the cold energy recovery facility 100 includes a hydrogen line 12 for guiding hydrogen from the liquid hydrogen tank 10 to a supply destination, and a first heat exchanger 50 provided on the hydrogen line 12. In the cold energy recovery facility 100, liquid hydrogen from the liquid hydrogen tank 10 is vaporized by heat exchange in the first heat exchanger 50 to become hydrogen gas. This hydrogen gas is heated to an appropriate temperature by a heater or the like as necessary and then supplied as fuel to the engine 6 or the fuel cell 8.

In some embodiments, the marine vessel 1 may be a tanker for carrying liquid hydrogen stored in a liquid hydrogen tank.

Note that the cold energy recovery facility according to the disclosure is not limited to a facility installed on a marine vessel. The cold energy recovery facility according to some embodiments may be installed on an aquatic facility other than a marine vessel, or may be installed on land.

Configuration of Cold Energy Recovery Facility

Hereinafter, the cold energy recovery facility 100 according to some embodiments will be described. FIGS. 2 to 9 are each a schematic diagram of the cold energy recovery facility 100 according to an embodiment.

As illustrated in FIGS. 2 to 9, the cold energy recovery facility 100 according to some embodiments includes the liquid hydrogen tank 10 for storing liquid hydrogen, the hydrogen line 12 through which the hydrogen from the liquid hydrogen tank 10 flows, a first circuit 22 through which a first working medium flows, a first turboexpander 24 provided in the first circuit 22, a second circuit 32 through which a second working medium having a freezing point higher than the first working medium flows, and a second turboexpander 34 provided in the second circuit 32. The cold energy recovery facility 100 further includes the first heat exchanger 50 for heat exchange between the hydrogen of the hydrogen line 12 and the first working medium of the first circuit 22, a second heat exchanger 52 for heat exchange between the first working medium of the first circuit 22 and the second working medium of the second circuit 32, and a third heat exchanger 54 for heat exchange between the second working medium of the second circuit 32 and a heat medium.

The liquid hydrogen in the liquid hydrogen tank 10 is fed by the pump 14 provided on the hydrogen line 12 and vaporized by heat exchange with the first heat medium at the first heat exchanger 50. The vaporized hydrogen may be supplied to a supply destination such as the engine 6 or the fuel cell 8 via the hydrogen line 12. A first hydrogen heater 60 configured to heat the hydrogen may be provided downstream of the first heat exchanger 50 in the hydrogen line 12. The first hydrogen heater 60 may be configured to heat the hydrogen by heat exchange with the heat medium (e.g., seawater).

The first circuit 22 and the first turboexpander 24 form a part of a first thermodynamic cycle 20 that uses the liquid hydrogen as a low-temperature heat source in the first heat exchanger 50 and uses the second working medium as a high-temperature heat source in the second heat exchanger 52.

The first thermodynamic cycle 20 illustrated in FIG. 1 is a Rankine cycle including the first turboexpander 24 provided in the first circuit 22, the first heat exchanger 50 provided downstream of the first turboexpander 24, a pump 23 provided downstream of the first heat exchanger 50, and the second heat exchanger 52 provided downstream of the pump 23. A first generator 26 may be connected to the first turboexpander 24.

The first turboexpander 24 is configured to expand the first working medium, which is in a gas state and flows through the first circuit 22 of the first thermodynamic cycle 20. Thus, the first generator 26 is driven to generate power. The first heat exchanger 50 is configured to condense the first working medium, output from the first turboexpander 24 in a gas state, by heat exchange with the liquid hydrogen serving as a low-temperature heat source. The pump 23 is configured to pressurize the first working medium condensed by the first heat exchanger 50 into a liquid. The second heat exchanger 52 is configured to evaporate the liquid first working medium pressurized by the pump 23 by heat exchange with the second working medium serving as a high-temperature heat source.

The first thermodynamic cycle 20 configured in this way can drive the first turboexpander 24 and/or the first generator 26 by using cold energy of the liquid hydrogen recovered by heat exchange in the first heat exchanger 50.

The second circuit 32 and the second turboexpander 34 form a part of a second thermodynamic cycle 30 that uses the first working medium as a low-temperature heat source in the second heat exchanger 52 and uses the heat medium as a high-temperature heat source in the third heat exchanger 54.

The second thermodynamic cycle 30 illustrated in FIG. 1 is a Rankine cycle including the second turboexpander 34 provided in the second circuit 32, the second heat exchanger 52 provided downstream of the second turboexpander 34, a pump 33 provided downstream of the second heat exchanger 52, and the third heat exchanger 54 provided downstream of the pump 33. A second generator 36 may be connected to the second turboexpander 34.

The second turboexpander 34 is configured to expand the second working medium, which is in a gas state and flows through the second circuit 32 of the second thermodynamic cycle 30. Thus, the second generator 36 is driven to generate power. The second heat exchanger 52 is configured to condense the second working medium, output from the second turboexpander 34 in a gas state, by heat exchange with the first working medium serving as a low-temperature heat source. The pump 33 is configured to pressurize the second working medium condensed by the second heat exchanger 52 into a liquid. The third heat exchanger 54 is configured to evaporate the liquid second working medium pressurized by the pump 33 by heat exchange with the heat medium serving as a high-temperature heat source.

The second thermodynamic cycle 30 configured in this way can drive the second turboexpander 34 and/or the second generator 36 by using cold energy of the liquid hydrogen recovered by heat exchange with the first working medium in the second heat exchanger 52.

The heat medium is supplied to the third heat exchanger 54 via a heat medium line 40. The heat medium line 40 may be provided with a pump 41 for feeding the heat medium.

As the second working medium described above, a fluid used as a working medium in a conventional cold energy recovery cycle of an LNG marine vessel or the like can be used. For example, an organic refrigerant such as R1234zee can be used.

As the first working medium described above, a fluid having a lower freezing point than the second working medium can be used. For example, nitrogen (N2) or a noble gas such as argon (Ar) can be used.

As the heat medium supplied to the third heat exchanger 54, seawater, a cooling fluid (cooling water or cooling oil) obtained after cooling a high-temperature device (e.g., an engine or a calculator described below), or the like can be used. The heat medium supplied to the third heat exchanger 54 may be a fluid having a higher freezing point than the second working medium.

Note that the first hydrogen heater 60 provided on the hydrogen line 12 may be supplied with the same heat medium as the heat medium supplied to the third heat exchanger 54. As illustrated in, for example, FIG. 2, the heat medium may be supplied to the first hydrogen heater 60 via a diverging line 42 that diverges from the heat medium line 40 passing through the third heat exchanger 54. Alternatively, in some embodiments, the first hydrogen heater 60 may be supplied with a heat medium different from the heat medium supplied to the third heat exchanger 54.

In the embodiments described above, the freezing point of the first working medium is lower than that of the second working medium in the cold energy recovery facility 100 including the first thermodynamic cycle 20 that uses the first working medium and uses the liquid hydrogen as a low-temperature heat source in the first heat exchanger 50, and the second thermodynamic cycle 30 that uses the second working medium and uses the first working medium as a low-temperature heat source in the second heat exchanger 52. Thus, in the first thermodynamic cycle 20, heat exchange is performed between the first working medium having a relatively low freezing point and cryogenic liquid hydrogen, so that the first working medium does not easily freeze in the first heat exchanger 50. In addition, in the second thermodynamic cycle 30, heat exchange is performed in the third heat exchanger 54 between the second working medium having a relatively high freezing point and the heat medium serving as a high-temperature heat source. Thus, even when the heat medium is a fluid having a relatively high freezing point (e.g., seawater), the heat medium does not easily freeze in the third heat exchanger 54. Thus, according to the embodiments described above, it is possible to suppress freezing of the fluids flowing through the heat exchangers while recovering cold energy of the liquid hydrogen.

In addition, in the embodiments described above, the first turboexpander 24 and the second turboexpander 34 are driven in a multi-stage thermodynamic cycle including the first thermodynamic cycle and the second thermodynamic cycle. Thus, the overall power of the turbines can be increased as compared to a conventional configuration that employs a single-stage thermodynamic cycle. When the first generator 26 and the second generator 36 are connected to the first turboexpander 24 and the second turboexpander 34, respectively, the overall power generation amount can be increased as compared to a conventional configuration that employs a single-stage thermodynamic cycle.

In some embodiments, as illustrated in, for example, FIGS. 3 to 6, the cold energy recovery facility 100 further includes a second hydrogen heater 62 provided downstream of the first heat exchanger 50 and upstream of the first hydrogen heater 60 in the hydrogen line 12. The second hydrogen heater 62 is configured to heat the hydrogen in the hydrogen line 12 by heat exchange with at least some of the second working medium discharged from the second turboexpander 34 of the second thermodynamic cycle 30.

Figure 3:
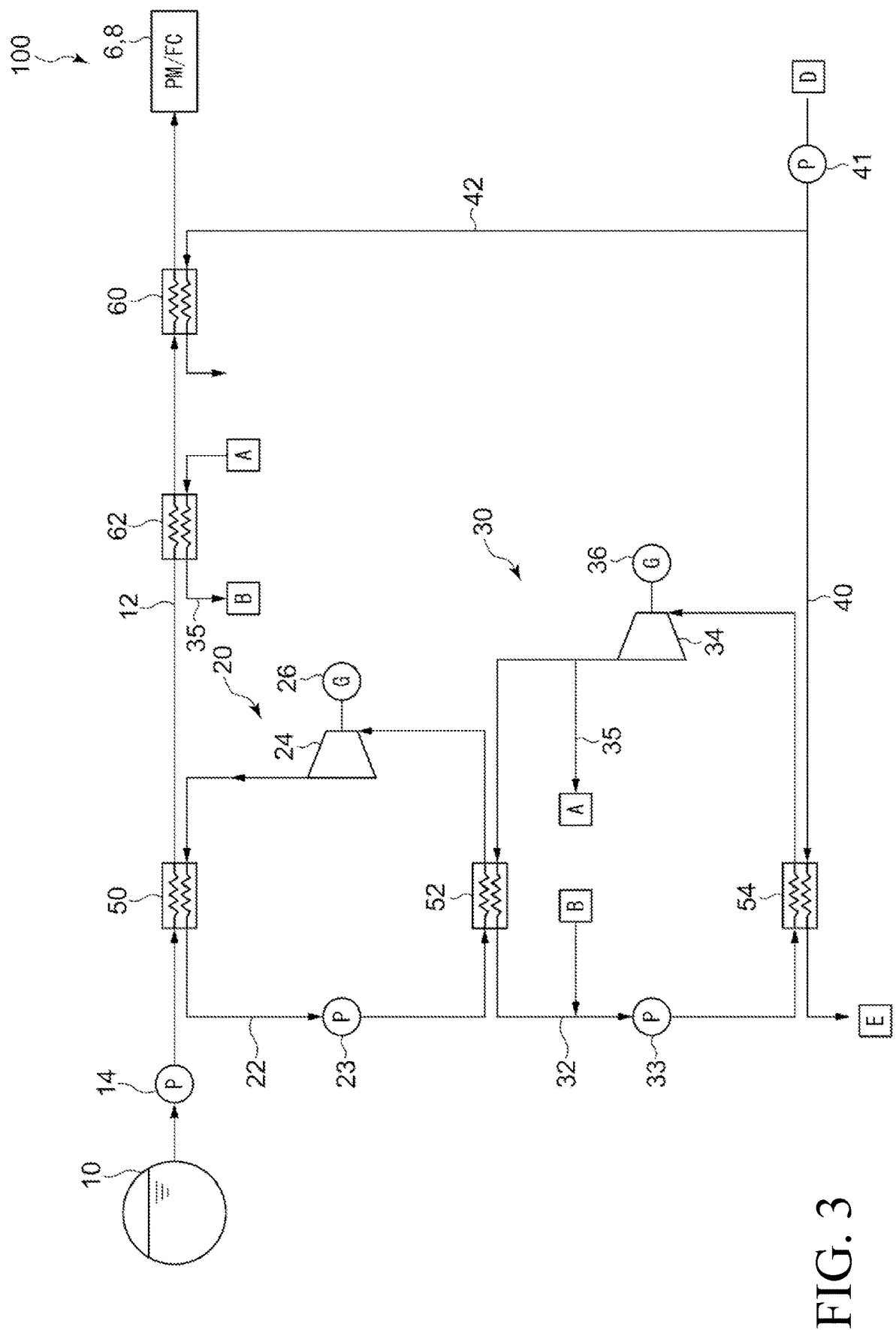
FIG. 3 is a schematic diagram of a cold energy recovery facility according to an embodiment.
Figure 6:
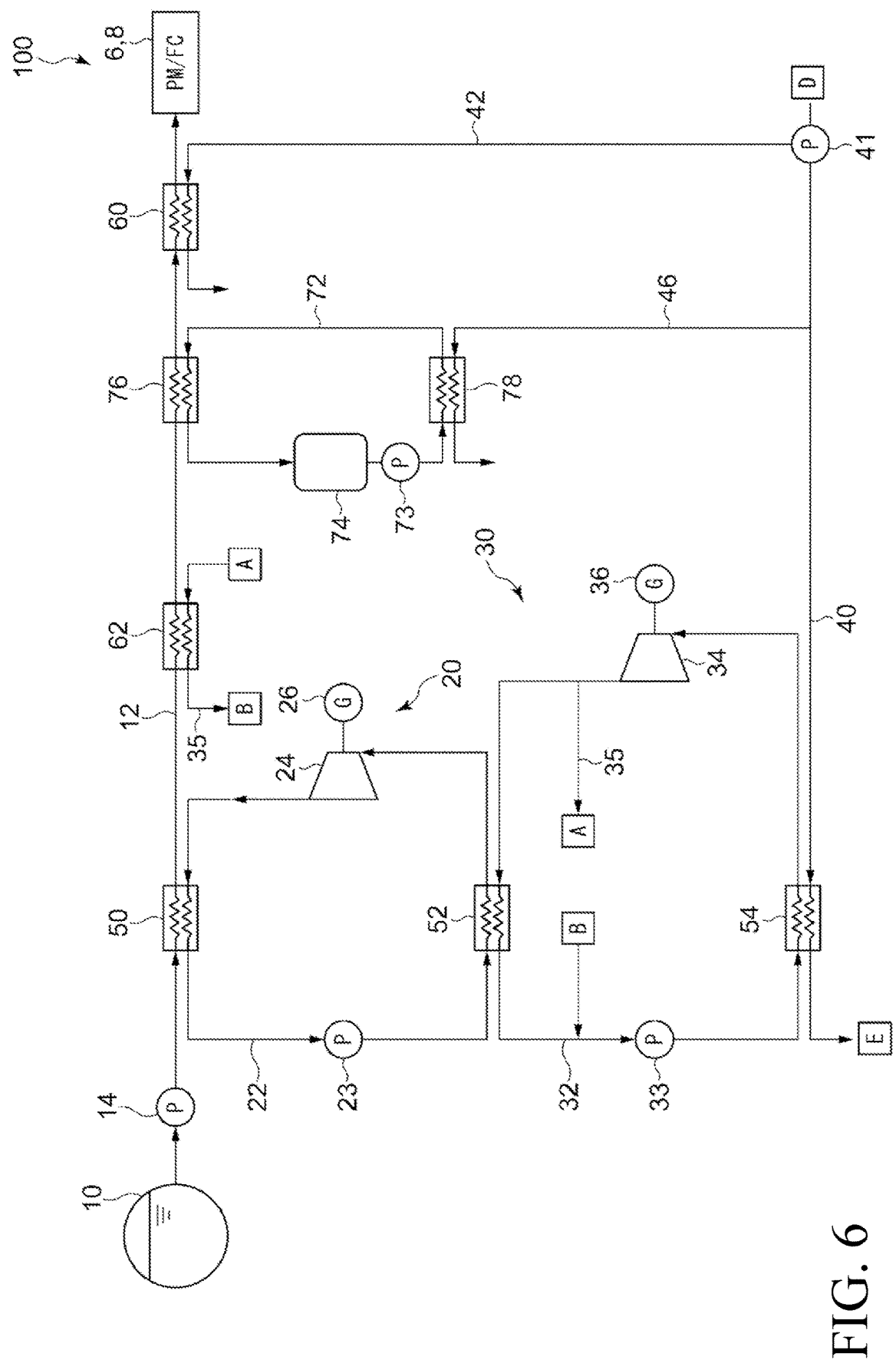
FIG. 6 is a schematic diagram of a cold energy recovery facility according to an embodiment.

In the exemplary embodiments illustrated in FIGS. 3 and 6, the second heat exchanger 52 and the second hydrogen heater 62 are provided in parallel in the second circuit 32. Specifically, the second hydrogen heater 62 is provided on a bypass line 35 provided to bypass the second heat exchanger 52 in the second circuit 32. The bypass line 35 is provided to diverge from the second circuit 32 on a side downstream of the second turboexpander 34 and upstream of the second heat exchanger 52 and merge into the second circuit 32 on a side downstream of the second heat exchanger 52 and upstream of the pump 33 (i.e., upstream of the third heat exchanger 54).

Figure 4:
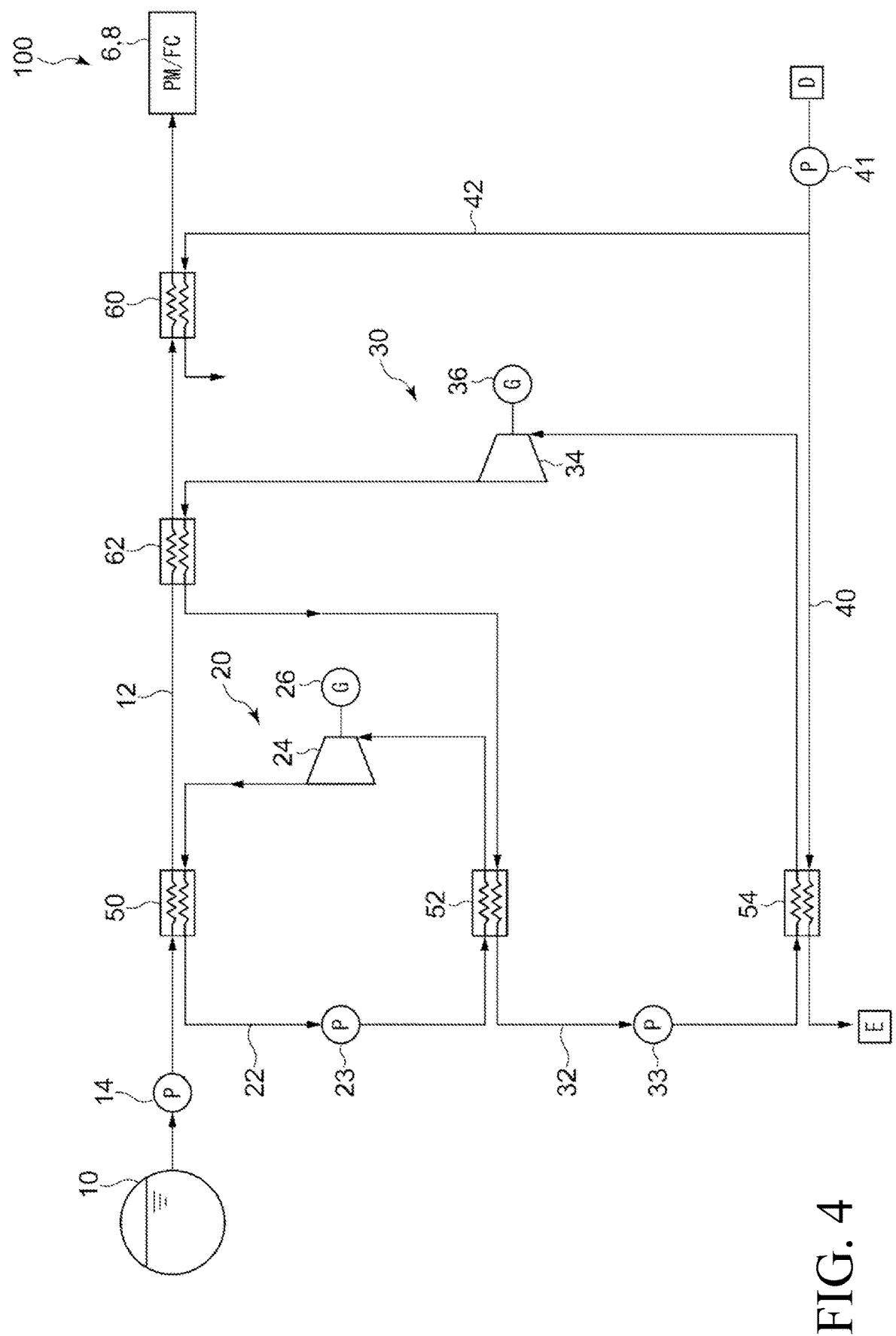
FIG. 4 is a schematic diagram of a cold energy recovery facility according to an embodiment.
Figure 5:
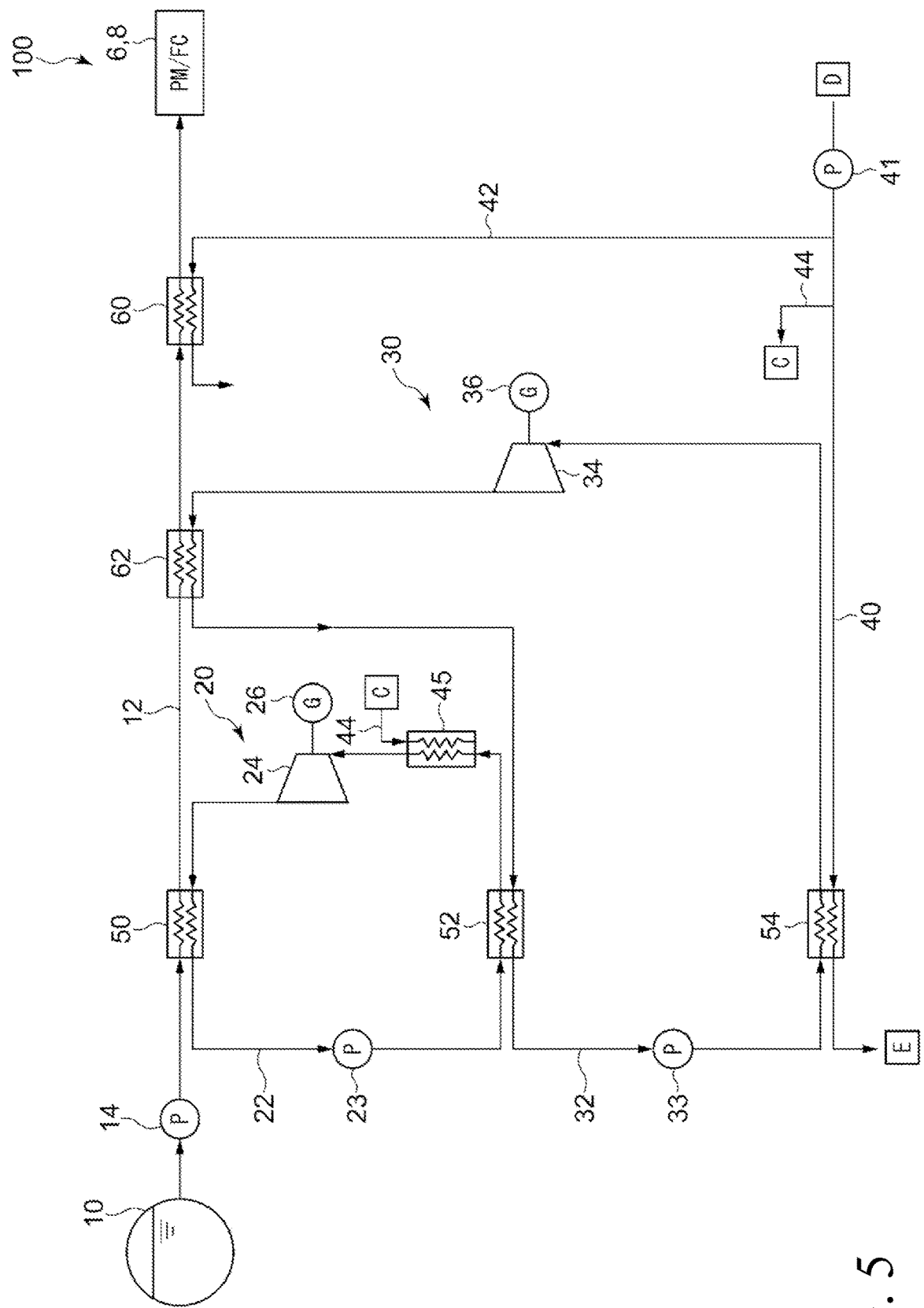
FIG. 5 is a schematic diagram of a cold energy recovery facility according to an embodiment.

In the exemplary embodiments illustrated in FIGS. 4 and 5, the second heat exchanger 52 and the second hydrogen heater 62 are provided in series in the second circuit 32. Specifically, the second hydrogen heater 62 is provided downstream of the second turboexpander 34 and upstream of the second heat exchanger 52 in the second circuit 32.

In the embodiments described above, in the hydrogen line 12 for guiding the hydrogen to the supply destination, the second hydrogen heater 62 for heat exchange between the hydrogen and the second working medium is provided upstream of the first hydrogen heater 60 for heat exchange between the hydrogen and the heat medium. Thus, in the first hydrogen heater 60, heat exchange occurs between the heat medium and the hydrogen, the temperature of which has been increased by heat exchange with the second working medium in the second hydrogen heater 62. Thus, even when the heat medium supplied to the first hydrogen heater 60 is a fluid having a relatively high freezing point (e.g., seawater), the heat medium does not easily freeze in the first hydrogen heater 60. Consequently, freezing of the fluid flowing through the first hydrogen heater 60 (heat exchanger) can be suppressed.

In some embodiments, as illustrated in, for example, FIG. 6, the cold energy recovery facility 100 further includes a third hydrogen heater 76 provided downstream of the second hydrogen heater 62 and upstream of the first hydrogen heater 60 in the hydrogen line 12.

In the exemplary embodiment illustrated in FIG. 6, the third hydrogen heater 76 is configured to heat the hydrogen by heat exchange with an intermediate medium circulating in an intermediate medium circulation line 72. The intermediate medium circulation line 72 is provided with an intermediate medium cooler 78 for heating the intermediate medium by heat exchange with the heat medium, and a pump 73. Thus, by the intermediate medium circulating in the intermediate medium circulation line 72, heat of the heat medium is transferred to the hydrogen via the intermediate medium, thereby heating the hydrogen.

An example of the intermediate medium includes an organic medium such as glycol water or propane.

Note that the intermediate medium circulation line 72 may be provided with an intermediate medium tank 74 for storing the intermediate medium. Further, the intermediate medium cooler 78 may be configured to be supplied with the heat medium via a diverging line 46 that diverges from the heat medium line 40.

According to the embodiments described above, the third hydrogen heater 76 for heat exchange between the hydrogen and the intermediate medium flowing through the intermediate medium circulation line 72 is provided downstream of the second hydrogen heater 62 and upstream of the first hydrogen heater 60 in the hydrogen line 12, and the intermediate medium cooler 78 for heating the intermediate medium by heat exchange with the heat medium (seawater) is provided on the intermediate medium circulation line 72. Thus, in the third hydrogen heater 76, the hydrogen after being heated in the second hydrogen heater 62 is further heated by heat exchange with the intermediate medium transporting heat of the heat medium. Thus, freezing of the heat medium in the first hydrogen heater 60 located downstream of the third hydrogen heater 76 in the hydrogen line 12 can be more effectively suppressed.

In the exemplary embodiments illustrated in FIGS. 3 to 6, to more reliably prevent freezing of the heat medium in the first hydrogen heater 60, the temperature of the second working medium supplied to the second hydrogen heater 62 (i.e., the temperature at the outlet of the second turboexpander 34) may need to be adjusted (to be increased to some extent). In such a case, the temperature of the second working medium at the outlet of the second turboexpander 34 can be adjusted, for example, as follows.

Figure 11:
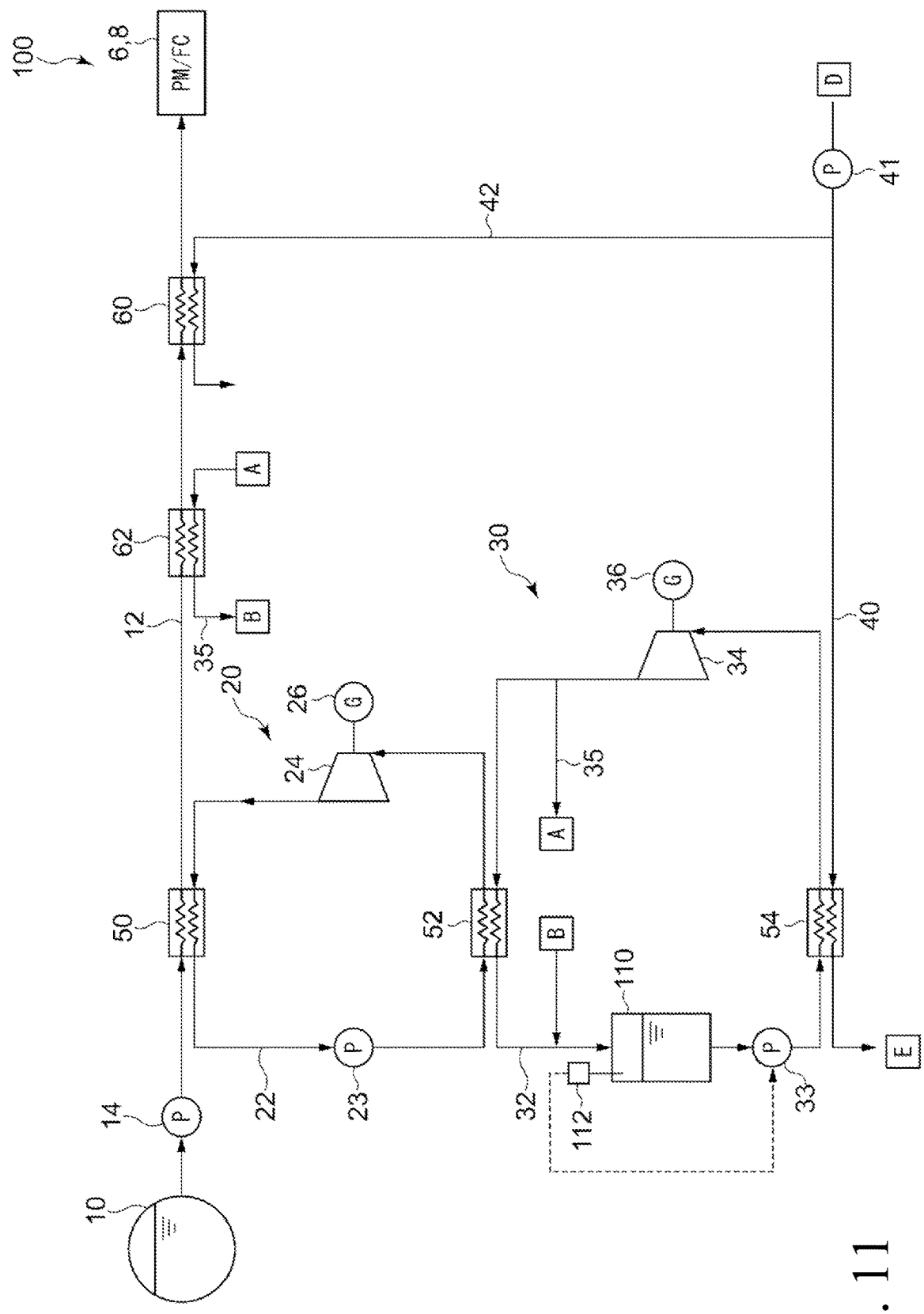
FIG. 11 is a schematic diagram of a cold energy recovery facility according to an embodiment.

FIG. 11 is a schematic diagram of the cold energy recovery facility 100 according to one embodiment, and illustrates a modification example of the cold energy recovery facility 100 illustrated in FIG. 3.

In the embodiment illustrated in FIG. 11, a storage tank 110 for storing the second working medium is provided downstream of the second heat exchanger 52 (more specifically, downstream of the merging point of the bypass line 35) and upstream of the pump 33 in the second circuit 32. The storage tank 110 is a tank for storing a surplus of the second working medium so that the second working medium in a liquid state can be stably delivered, even when the balance between evaporation and condensation of the second working medium in the second thermodynamic cycle 30 changes.

The storage tank 110 is provided with a pressure sensor 112 for detecting the pressure inside the storage tank 110. Also, the rotational speed of the pump 33 is controlled based on the pressure value in the storage tank 110 detected by the pressure sensor 112.

The pressure of a high-pressure part (part between the outlet of the pump 33 and the inlet of the second turboexpander 34) in the second circuit 32 is controlled by the delivery pressure of the pump 33, and the pressure of a low-pressure part (part between the outlet of the second turboexpander 34 and the inlet of the pump 33) is controlled by the temperature of the condensate of the second working medium.

Thus, first, the rotational speed of the pump 33 is adjusted to change the flow rate of the second working medium in the second circuit 32. When the flow rate of the second working medium is changed, the temperature of the cooling medium at the outlet of the second heat exchanger 52 changes, and thus the pressure in the storage tank 110 changes. By feeding back the pressure inside the storage tank 110, which is detected by the pressure sensor 112, to the pump 33, the pressure of the low-pressure part can be controlled. This can also adjust the temperature of the second working medium at the outlet of the second turboexpander 34.

In this way, the temperature of the second working medium supplied to the second hydrogen heater 62 (i.e., the temperature at the outlet of the second turboexpander 34) can be adjusted appropriately.

The above mechanism for adjusting the pressure and/or temperature of the second circuit 32 (configuration including the storage tank 110 and the pressure sensor 112) is applicable to each of the embodiments illustrated in FIGS. 3 to 6.

Note that, although not specifically illustrated, a storage tank for storing the first working medium may be provided downstream of the first heat exchanger 50 and upstream of the pump 23 in the first circuit 22 in some embodiments. By providing this storage tank, a surplus of the first working medium can be stored so that the first working medium in a liquid state can be stably delivered, even when the balance between evaporation and condensation of the first working medium in the first thermodynamic cycle 20 changes.

In some embodiments, as illustrated in, for example, FIG. 5, the cold energy recovery facility 100 includes a working medium heater 45 for heating the first working medium upstream of the first turboexpander 24 in the first circuit 22. The working medium heater 45 is provided downstream of the second heat exchanger 52 and upstream of the first turboexpander 24 in the first circuit 22. In the exemplary embodiment illustrated in FIG. 5, the working medium heater 45 is configured to heat the first working medium by heat exchange with the heat medium. The working medium heater 45 is supplied with the heat medium via a diverging line 44 diverging from the heat medium line 40.

According to the embodiments described above, the working medium heater 45 for heating the first working medium flowing upstream of the first turboexpander 24 in the first circuit 22 is provided. Thus, the temperature of the working medium at the inlet of the first turboexpander 24 can be increased. Thus, the heat drop between the inlet and outlet of the first turboexpander 24 can be increased, whereby the power of the first turboexpander 24 can be increased.

Note that in the embodiments illustrated in FIGS. 3 to 6, since the second working medium is cooled in the second hydrogen heater 62 provided in the second circuit 32, the amount of heat exchange between the first working medium and the second working medium in the second heat exchanger 52 may be reduced as compared to a case where the second hydrogen heater 62 is not provided. Even in such a case, since the gas temperature at the inlet of the first turboexpander 24 can be increased by providing the above-described working medium heater 45, the power reduction of the first turboexpander 24 can be suppressed.

Figure 7:
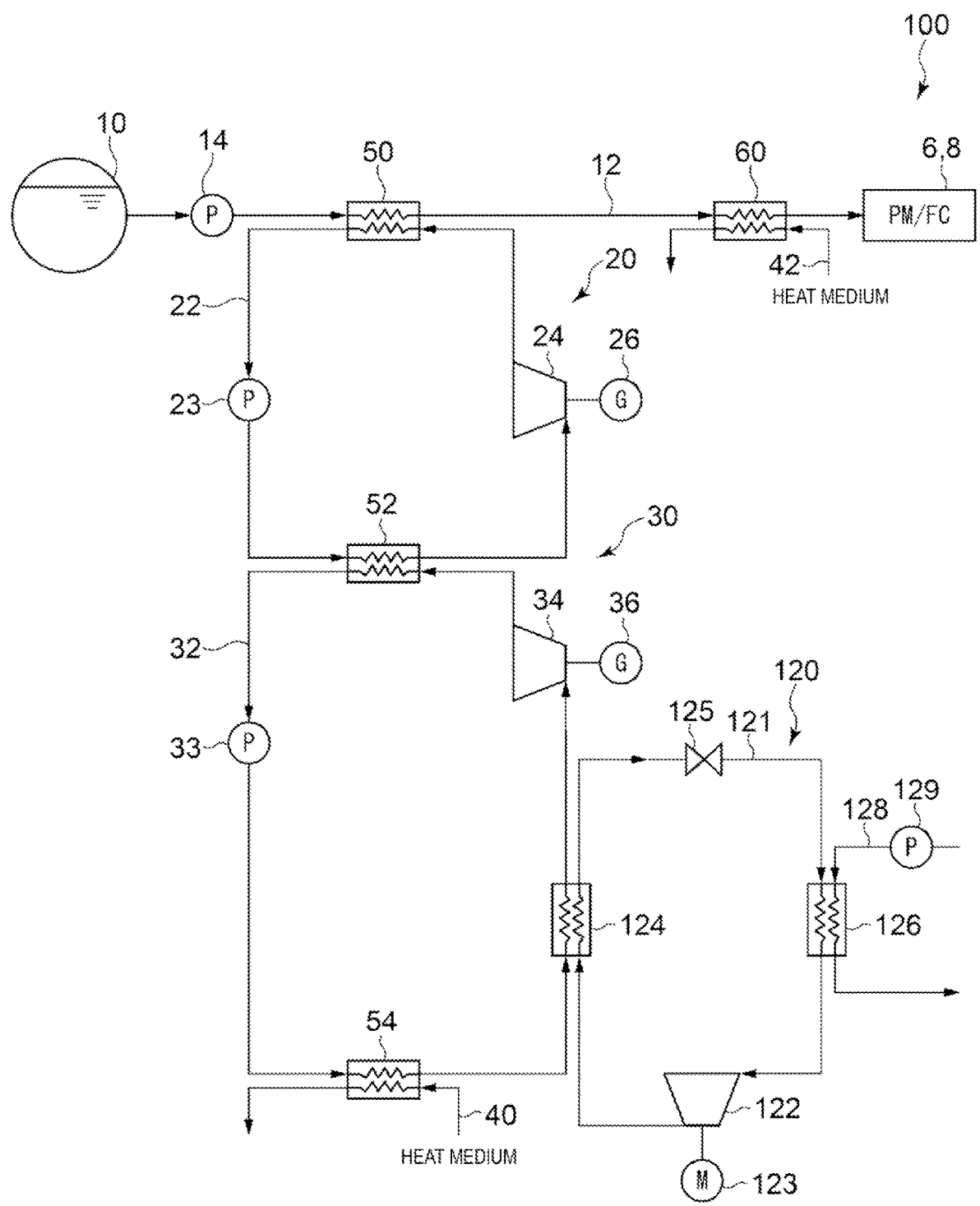
FIG. 7 is a schematic diagram of a cold energy recovery facility according to an embodiment.
Figure 8:
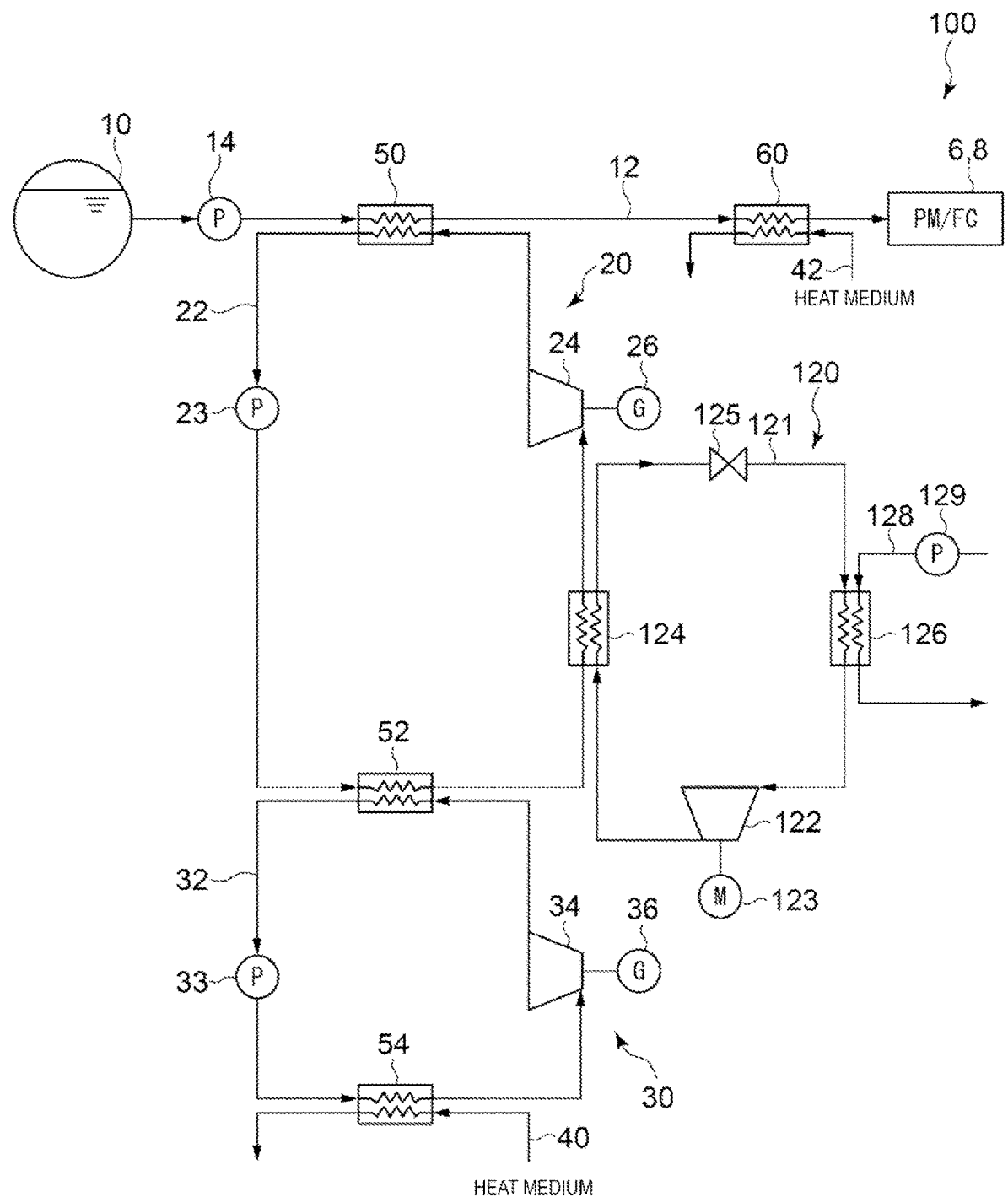
FIG. 8 is a schematic diagram of a cold energy recovery facility according to an embodiment.

In some embodiments, as illustrated in, for example, FIGS. 7 and 8, the cold energy recovery facility 100 includes an air conditioning cycle 120 that uses a third working medium as a cooling medium. The air conditioning cycle 120 includes a third circuit 121 through which the third working medium circulates, a condenser 124 for condensing the third working medium, an expansion valve 125 for expanding the condensed third working medium, an evaporator 126 for evaporating the expanded third working medium, and a compressor 122 for compressing the third working medium in a gas state. The condenser 124, the expansion valve 125, the evaporator 126, and the compressor 122 are provided in the third circuit 121. The compressor 122 is driven by a motor 123.

The condenser 124 is configured to condense the third working medium of the air conditioning cycle 120 by heat exchange with the working medium in a gas state upstream of the turboexpander of the first thermodynamic cycle 20 or the second thermodynamic cycle 30. In the exemplary embodiment illustrated in FIG. 8, the condenser 124 is configured to condense the third working medium by heat exchange with the first working medium in a gas state upstream of the first turboexpander 24 in the first circuit 22 that forms the first thermodynamic cycle 20. In the exemplary embodiment illustrated in FIG. 7, the condenser 124 is configured to condense the third working medium by heat exchange with the second working medium in a gas state upstream of the second turboexpander 34 in the second circuit 32 that forms the second thermodynamic cycle 30.

The evaporator 126 is configured to evaporate the third working medium by heat exchange with the heat medium supplied via a heat medium line 128. The heat medium line 128 may be provided with a pump 129 for feeding the heat medium. The heat medium supplied to the evaporator 126 may be water, seawater, or a cooling fluid for cooling a device.

According to the embodiments described above, the first working medium or the second working medium can be heated by heat exchange with the third working medium in the condenser 124, into which the high-temperature high-pressure third working medium compressed by the compressor 122 flows in the air conditioning cycle 120. Thus, the heat drop between the inlet and the outlet of the first turboexpander 24 or the second turboexpander 34 can be increased, so that the power of the first turboexpander 24 or the second turboexpander 34 can be increased.

Note that the configuration of the air conditioning cycle 120 is not limited to the illustrated configuration, and various known air conditioning cycles can be applied.

Figure 9:
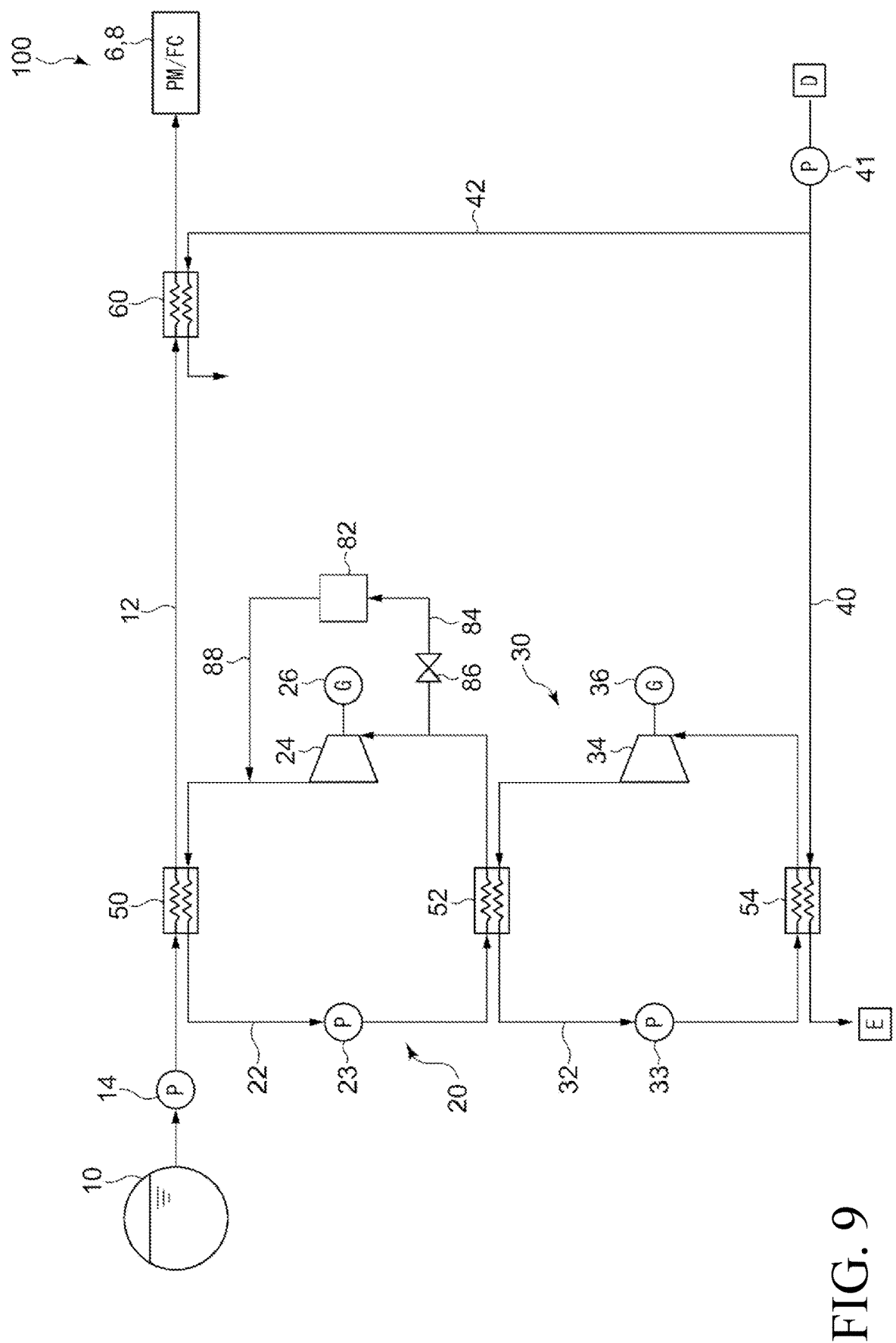
FIG. 9 is a schematic diagram of a cold energy recovery facility according to an embodiment.

In some embodiments, as illustrated in, for example, FIG. 9, the cold energy recovery facility 100 includes a supply line 84 for supplying the first working medium to a device 82, and a return line 88 for returning the first working medium from the device 82 to the first circuit 22. The supply line 84 diverges from the first circuit 22 on an upstream side of the first turboexpander 24, and the return line 88 merges into the first circuit 22 on a downstream side of the first turboexpander 24. The first circuit 22 is configured such that an inert substance (e.g., nitrogen or a noble gas such as argon) serving as the first working medium circulates. Note that in FIG. 9, the supply line 84 is provided with a valve 86 for adjusting the amount of the first working medium flowing through the supply line 84.

According to the embodiments described above, the inert substance is used as the first working medium, and the supply line 84 diverging from the first circuit 22 on an upstream side of the first turboexpander 24, and the return line 88 merging into the first circuit 22 on a downstream side of the first turboexpander 24 are provided. Thus, the pressure difference between the inlet and the outlet of the first turboexpander 24 in the first circuit 22 can be used to supply the inert substance in a gas state (inert gas) to the device 82 via the supply line 84, and return the gas of the inert substance from the device 82 to the first circuit 22 via the return line 88. In this way, the first working medium being an inert substance can be used effectively for another purpose.

The device 82 described above may be, for example, a gas transport tube for transporting combustible gas. The gas transport tube may have a double tube structure including an inner peripheral pipe for allowing the combustible gas to flow and an outer peripheral pipe provided around the outer periphery of the inner peripheral pipe. Then, the gas of the inert substance may be supplied to the outer peripheral pipe of the gas transport tube via the supply line 84 described above. Note that the gas transport tube described above may be a pipe constituting the hydrogen line 12.

According to the embodiments described above, since the gas (inert gas) of the first working medium being an inert substance is supplied to the outer peripheral pipe of the gas transport tube having a double tube structure, the combustible gas is transferred by the inert gas even after leaking from the inner peripheral pipe, and thus leakage can be detected early by a gas detector. In this way, the first working medium can be used effectively for early detection of gas leakage.

As described above, the heat medium supplied to the third heat exchanger 54 via the heat medium line 40 may include the cooling fluid (cooling water or cooling oil) after cooling the high-temperature device.

In this case, the cooling fluid that has cooled the high-temperature device is supplied to the third heat exchanger 54 as the heat medium. Thus, the cooling fluid that has cooled the high-temperature device as a high-temperature heat source for actuating the thermodynamic cycle can be used to suppress freezing of the fluid flowing through the heat exchanger while recovering cold energy of the liquid hydrogen.

Figure 10:
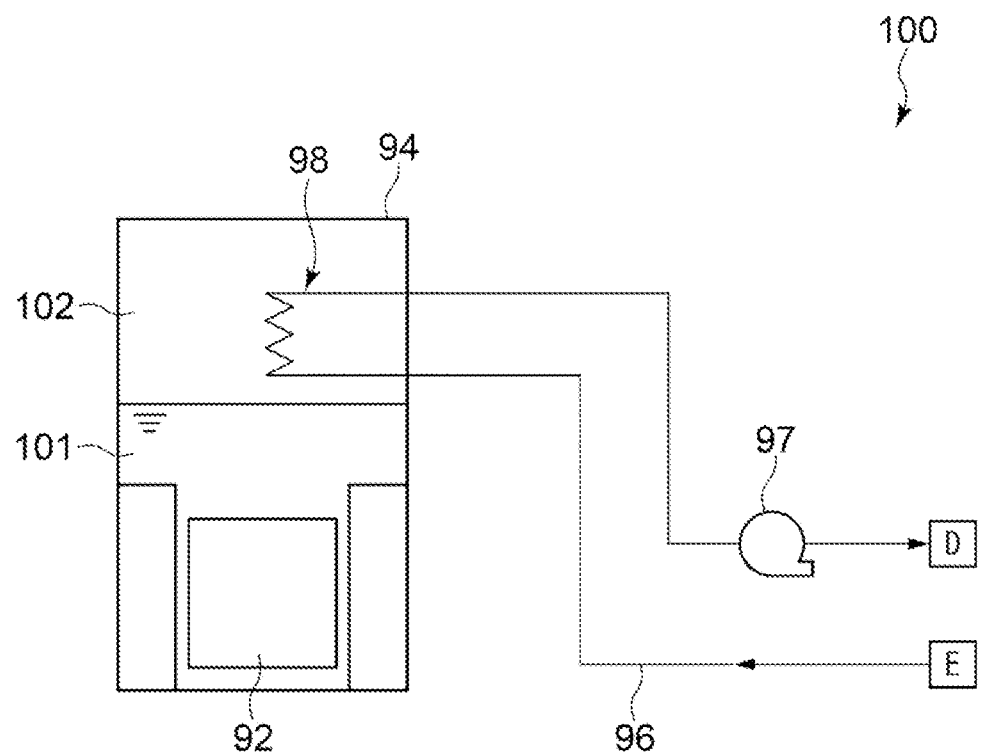
FIG. 10 is a schematic diagram of an example of a calculator (high-temperature device).

The above high-temperature device may include a calculator. FIG. 10 is a schematic diagram of a calculator, which is an example of the high-temperature device. The calculator 92 illustrated in FIG. 10 is an immersion server configured to be cooled by being immersed in refrigerant oil 101 in a liquid state.

The calculator 92 is installed in an immersion tank 94 in a state of being immersed in the refrigerant oil 101 in a liquid state. Additionally, a condenser 98 is provided above the calculator 92 in the immersion tank 94. The immersion tank 94 has a hermetically sealed structure. The refrigerant oil 101 in a liquid state and refrigerant oil 102 in a gas state coexist in the immersion tank 94. A cooling fluid (e.g., cooling water or cooling oil) is supplied to the condenser 98 via a cooling fluid line 96. Note that the cooling fluid line 96 is provided with a pump 97.

In the immersion tank 94, the refrigerant oil 101 in a liquid state is vaporized by being subject to heat from the calculator 92. Also, the refrigerant oil 102 in a gas state is cooled by the condenser 98 and liquefied. By repeating the cycle of vaporization and liquefaction of the refrigerant oil, heat from the calculator 92 is transferred to the cooling fluid via the refrigerant oil and the condenser 98 in the immersion tank 94. In this way, the calculator 92 is cooled by the cooling fluid.

The cooling fluid discharged from a condenser 90 in the cooling fluid line 96 is supplied to the third heat exchanger 54 via the heat medium line 40. Note that the cooling fluid discharged from the third heat exchanger 54 in the heat medium line 40 may again be supplied to the condenser 98 of the immersion tank 94 via the cooling fluid line 96.

Note that the calculator serving as the high-temperature device described above is not limited to the immersion server. In some embodiments, the calculator may be another known liquid-cooled calculator, for example, a water-cooled calculator in which the processor is cooled by water.

According to the embodiments described above, the cooling fluid that has cooled the calculator 92 is supplied to the third heat exchanger 54 as the heat medium. Thus, the cooling fluid that has cooled the calculator 92 as the high-temperature heat source for actuating the thermodynamic cycle can be used to suppress freezing of the fluid flowing through the heat exchanger while recovering cold energy of the liquid hydrogen.

The contents described in each of the above-mentioned embodiments are understood as follows, for example.

(1) A cold energy recovery facility (100) according to at least one embodiment of the disclosure includes:
- a liquid hydrogen tank (10) configured to store liquid hydrogen,
- a first circuit (22) configured to circulate a first working medium,
- a second circuit (32) configured to circulate a second working medium having a freezing point higher than the first working medium,
- a first turboexpander (24) provided in the first circuit, the first turboexpander being configured to be driven by the first working medium in a gas state,
- a second turboexpander (34) provided in the second circuit, the second turboexpander being configured to be driven by the second working medium in a gas state,
- a first heat exchanger (50) configured to vaporize the liquid hydrogen from the liquid hydrogen tank by heat exchange with the first working medium,
- a second heat exchanger (52) configured to vaporize the first working medium in a liquid state by heat exchange with the second working medium, and
- a third heat exchanger (54) configured to vaporize the second working medium in a liquid state by heat exchange with a heat medium, wherein
- the first circuit and the first turboexpander form a part of a first thermodynamic cycle (20) that uses the liquid hydrogen as a low-temperature heat source in the first heat exchanger, and
- the second circuit and the second turboexpander form a part of a second thermodynamic cycle (30) that uses the first working medium as a low-temperature heat source in the second heat exchanger.

With the configuration of (1) described above, the freezing point of the first working medium is lower than that of the second working medium in the cold energy recovery facility including the first thermodynamic cycle that uses the first working medium and uses the liquid hydrogen as the low-temperature heat source in the first heat exchanger and the second thermodynamic cycle that uses the second working medium and uses the first working medium as the low-temperature heat source in the second heat exchanger. Thus, in the first thermodynamic cycle, heat exchange is performed between the first working medium having a relatively low freezing point and the cryogenic liquid hydrogen, so that the first working medium does not easily freeze in the first heat exchanger. In addition, in the second thermodynamic cycle, heat exchange is performed between the second working medium having a relatively high freezing point and the heat medium serving as the high-temperature heat source in the third heat exchanger. Thus, even when the heat medium is a fluid having a relatively high freezing point (e.g., seawater), the heat medium does not easily freeze in the third heat exchanger. Thus, with the configuration of (1) described above, it is possible to suppress freezing of the fluids flowing through the heat exchangers while recovering cold energy of the liquid hydrogen. In addition, with the configuration of (1) described above, the first turboexpander and the second turboexpander are driven in a multi-stage thermodynamic cycle including the first thermodynamic cycle and the second thermodynamic cycle. Thus, the overall power of the turbines can be increased as compared to a conventional configuration using a single-stage thermodynamic cycle.

(2) According to some embodiments, in the configuration of (1) described above, the cold energy recovery facility further includes a hydrogen line (12) configured to guide the hydrogen from the liquid hydrogen tank to a supply destination,
- a first hydrogen heater (60) provided downstream of the first heat exchanger in the hydrogen line, the first hydrogen heater being configured to heat the hydrogen in the hydrogen line by heat exchange with the heat medium, and
- a second hydrogen heater (62) provided downstream of the first heat exchanger and upstream of the first hydrogen heater in the hydrogen line, the second hydrogen heater being configured to heat the hydrogen in the hydrogen line by heat exchange with at least some of the second working medium discharged from the second turboexpander.

With the configuration of (2) described above, in the hydrogen line for guiding the hydrogen to the supply destination, the second hydrogen heater for heat exchange between the hydrogen and the second working medium is provided upstream of the first hydrogen heater for heat exchange between the hydrogen and the heat medium. Thus, the hydrogen, the temperature of which has been increased by heat exchange with the second working medium, exchanges heat with the heat medium in the first hydrogen heater. Thus, even when the heat medium supplied to the first hydrogen heater is a fluid having a relatively high freezing point (e.g., seawater), the heat medium does not easily freeze in the first hydrogen heater. Thus, with the configuration of (2) described above, freezing of the fluid flowing through the first hydrogen heater (heat exchanger) can be suppressed.

(3) According to some embodiments, in the configuration of (2) described above, the second hydrogen heater is configured to condense the at least some of the second working medium by heat exchange with the hydrogen.

With the configuration of (3) described above, the cold energy of the hydrogen is used to condense the first working medium in the first heat exchanger and to condense the second working medium in the second hydrogen heater. In this way, the cold energy of hydrogen can be used effectively to activate the two thermodynamic cycles (first thermodynamic cycle and second thermodynamic cycle).

(4) According to some embodiments, in the configuration of (2) or (3) described above, the cold energy recovery facility further includes
- a bypass line (35) that diverges from the second circuit on a side downstream of the second turboexpander and upstream of the second heat exchanger and merges into the second circuit on a side downstream of the second heat exchanger and upstream of the third heat exchanger, wherein
- the second hydrogen heater is configured to heat the hydrogen by heat exchange with the at least some of the second working medium flowing through the bypass line.

With the configuration of (4) described above, the some of the second working medium discharged from the second turboexpander in the second circuit is supplied to the second hydrogen heater via the bypass line. Thus, the hydrogen can be appropriately heated by heat exchange with the some of the second working medium in the second hydrogen heater. As a result, freezing of the heat medium in the first hydrogen heater provided downstream of the second hydrogen heater in the hydrogen line can be suppressed.

(5) According to some embodiments, in the configuration of (2) or (3) described above, the second hydrogen heater is provided downstream of the second turboexpander and upstream of the second heat exchanger in the second circuit.

With the configuration of (5) described above, the second working medium discharged from the second turboexpander in the second circuit is supplied to the second hydrogen heater. Thus, the hydrogen can be appropriately heated by heat exchange with the second working medium in the second hydrogen heater. As a result, freezing of the heat medium in the first hydrogen heater provided downstream of the second hydrogen heater in the hydrogen line can be suppressed.

(6) According to some embodiments, in any of the configurations (2) to (5) described above, the cold energy recovery facility further includes
an intermediate medium circulation line (72) configured to circulate an intermediate medium,
a third hydrogen heater (76) provided downstream of the second hydrogen heater and upstream of the first hydrogen heater in the hydrogen line, the third hydrogen heater being configured to heat the hydrogen by heat exchange with the intermediate medium, and
an intermediate medium cooler (78) provided on the intermediate medium circulation line, the intermediate medium cooler being configured to heat the intermediate medium by heat exchange with the heat medium.

With the configuration of (6) described above, the third hydrogen heater for heat exchange between the intermediate medium in the intermediate medium circulation line and the hydrogen is provided downstream of the second hydrogen heater and upstream of the first hydrogen heater in the hydrogen line, and the intermediate medium cooler for heating the intermediate medium by heat exchange with the heat medium (e.g., seawater) is provided on the intermediate medium circulation line. Thus, in the third hydrogen heater, the hydrogen after being heated by the second hydrogen heater is further heated by heat exchange with the intermediate medium that transports the heat of the heat medium. Thus, freezing of the heat medium in the first hydrogen heater located downstream of the third hydrogen heater in the hydrogen line can be more efficiently suppressed.

(7) According to some embodiments, in any of the configurations (1) to (6) described above, the cold energy recovery facility further includes
a working medium heater (45) provided downstream of the second heat exchanger and upstream of the first turboexpander in the first circuit, the working medium heater being configured to heat the first working medium flowing through the first circuit.

With the configuration of (7) described above, the working medium heater for heating the first working medium flowing upstream of the first turboexpander in the first circuit is provided. Thus, the temperature of the working medium at the inlet of the first turboexpander can be increased. Thus, the heat drop between the inlet and the outlet of the first turboexpander can be increased, so that the power of the first turboexpander can be increased.

(8) According to some embodiments, in any of the configurations (1) to (7) described above, the cold energy recovery facility further includes
a first generator (26) configured to be driven by the first turboexpander, and
a second generator (36) configured to be driven by the second turboexpander.

With the configuration of (8) described above, the first generator and the second generator can be driven by the first turboexpander and the second turboexpander, respectively. Thus, while the first generator and the second generator are driven using the cold energy of the liquid hydrogen, freezing of the fluid flowing through the heat exchanger (e.g., third heat exchanger) can be suppressed as described in (1) above.

In addition, with the configuration of (8) described above, the first turboexpander and the second turboexpander are driven in a multi-stage thermodynamic cycle including the first thermodynamic cycle and the second thermodynamic cycle. Thus, the power generation amount by the generators can be increased as compared to a conventional configuration using a single-stage thermodynamic cycle.

(9) According to some embodiments, in the configuration of (8) above, the cold energy recovery facility further includes
a third circuit (121) forming a part of an air conditioning cycle (120), the third circuit being configured to circulate a third working medium, and
a condenser (124) forming a part of the air conditioning cycle, the condenser being configured to condense the third working medium flowing through the third circuit, wherein
the condenser is configured to condense the third working medium by heat exchange with the first working medium in a gas state upstream of the first turboexpander in the first circuit or the second working medium in a gas state upstream of the second turboexpander in the second circuit.

With the configuration of (9) described above, in the condenser into which the high-temperature high-pressure third working medium compressed by the compressor in the air conditioning cycle flows, the first working medium or the second working medium can be heated by heat exchange with the third working medium. Thus, the heat drop between the inlet and the outlet of the first turboexpander or the second turboexpander can be increased, so that the power of the first turboexpander or the second turboexpander can be increased.

(10) According to some embodiments, in any of the configurations (1) to (9) described above,
the first circuit is configured to circulate an inert substance as the first working medium, and
the cold energy recovery facility includes
a supply line (84) diverging from the first circuit on an upstream side of the first turboexpander, the supply line being configured to supply the first working medium to a device (82), and
a return line (88) merging into the first circuit on a downstream side of the first turboexpander, the return line being configured to return the first working medium from the device to the first circuit.

With the configuration of (10) described above, the inert substance is used as the first working medium, and the supply line diverging from the first circuit on the upstream side of the first turboexpander, and the return line merging into the first circuit on the downstream side of the first turboexpander are provided. Thus, by using the pressure difference between the inlet and the outlet of the first turboexpander in the first circuit, the gas of the inert substance can be supplied to the device via the supply line, and the gas of the inert substance from the device can be returned to the first circuit via the return line. In this way, the first working medium being an inert substance can be used effectively for another purpose.

(11) According to some embodiments, in the configuration of (10) described above, the cold energy recovery facility further includes a gas transport tube as the device, the gas transport tube being configured to transport combustible gas, wherein the gas transport tube has a double tube structure including an inner peripheral pipe configured to allow the combustible gas to flow and an outer peripheral pipe provided around an outer periphery of the inner peripheral pipe, and the outer peripheral pipe is configured to be supplied with the first working medium from the supply line.

With the configuration of (11) described above, the gas (inert gas) of the first working medium being an inert substance is supplied to the outer peripheral pipe of the gas transport tube having a double tube structure. Thus, the combustible gas is transported by the inert gas even after leaking from the inner peripheral pipe, so that the leakage can be detected early by a gas detector. In this way, the first working medium can be used effectively for early detection of gas leakage.

(12) According to some embodiments, in any one of the configurations (1) to (11) above, the cold energy recovery facility further includes a heat medium line (40) configured to supply the heat medium to the third heat exchanger, wherein the heat medium includes a cooling fluid that has cooled a high-temperature device.

With the configuration of (12) described above, the cooling fluid that has cooled the high-temperature device is supplied to the third heat exchanger as the heat medium. Thus, the cooling fluid that has cooled the high-temperature device as the high-temperature heat source for activating the thermodynamic cycle can be used effectively to suppress freezing of the fluid flowing through the heat exchanger while recovering cold energy of the liquid hydrogen as described in (1) above.

(13) According to some embodiments, in the configuration of (12) above, the high-temperature device includes a calculator (92).

With the configuration of (13) described above, the cooling fluid that has cooled the calculator is supplied to the third heat exchanger as the heat medium. Thus, the cooling fluid that has cooled the calculator as the high-temperature heat source for activating the thermodynamic cycle can be used effectively to suppress freezing of the fluid flowing through the heat exchanger while recovering cold energy of the liquid hydrogen as described in (1) above.

(14) A marine vessel (1) according to at least one embodiment of the disclosure includes:

a ship (2), the cold energy recovery facility (100) according to any one of (1) to (13), the cold energy recovery facility being provided in the ship, and an engine (6) or a fuel cell (8) provided in the ship, the engine or the fuel cell using, as fuel, the hydrogen vaporized in the first heat exchanger.

With the configuration of (14) described above, the freezing point of the first working medium is lower than that of the second working medium in the cold energy recovery facility including the first thermodynamic cycle that uses the first working medium and uses the liquid hydrogen as the low-temperature heat source in the first heat exchanger and the second thermodynamic cycle that uses the second working medium and uses the first working medium as the low-temperature heat source in the second heat exchanger. Thus, in the first thermodynamic cycle, heat exchange is performed between the first working medium having a relatively low freezing point and the cryogenic liquid hydrogen, so that the first working medium does not easily freeze in the first heat exchanger. In addition, in the second thermodynamic cycle, heat exchange is performed between the second working medium having a relatively high freezing point and the heat medium serving as the high-temperature heat source in the third heat exchanger. Thus, even when the heat medium is a fluid having a relatively high freezing point (e.g., seawater), the heat medium does not easily freeze in the third heat exchanger. Thus, with the configuration of (14) described above, it is possible to suppress freezing of the fluid flowing through the heat exchanger while recovering cold energy of the liquid hydrogen, which is fuel for the marine vessel.

Furthermore, in the configuration of (14) described above, the first turboexpander and the second turboexpander are driven in a multi-stage thermodynamic cycle including the first thermodynamic cycle and the second thermodynamic cycle. Thus, the overall power of the turbines can be increased as compared to a conventional configuration using a single-stage thermodynamic cycle.

Although the embodiments of the disclosure have been described above, the disclosure is not limited to the above-described embodiments, and also includes modifications of the above-described embodiments as well as appropriate combinations of the embodiments.

In the present specification, an expression of relative or absolute arrangement such as "in a direction", "along a direction", "parallel", "orthogonal", "centered", "concentric" or "coaxial" shall not be construed as indicating only the arrangement in a strict literal sense, and also includes a state where the arrangement is relatively displaced by a tolerance, or by an angle or a distance that can still achieve the same function.

For example, expressions indicating a state of being equal such as "same," "equal," or "uniform" shall not be construed as indicating only a state of being strictly equal but also as indicating a state in which there is a tolerance or a difference as long as the same function can be obtained.

In addition, in the present specification, an expression of a shape such as a rectangular shape or a cylindrical shape shall not be construed as only a geometrically strict shape, and also includes a shape with unevenness or chamfered corners or the like within the range in which the same effect can be achieved.

In addition, in the present specification, an expression such as "comprising", "including", or "having" one component is not intended to be exclusive of other components.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A cold energy recovery facility comprising:
a liquid hydrogen tank configured to store liquid hydrogen;
a first circuit configured to circulate a first working medium;

a second circuit configured to circulate a second working medium having a freezing point higher than the first working medium;

a first turboexpander provided in the first circuit, the first turboexpander being configured to be driven by the first working medium in a gas state;

a second turboexpander provided in the second circuit, the second turboexpander being configured to be driven by the second working medium in a gas state;

a first heat exchanger configured to vaporize the liquid hydrogen from the liquid hydrogen tank by heat exchange with the first working medium;

a second heat exchanger configured to vaporize the first working medium in a liquid state by heat exchange with the second working medium; and a third heat exchanger configured to vaporize the second working medium in a liquid state by heat exchange with a heat medium, wherein the first circuit and the first turboexpander form a part of a first thermodynamic cycle that uses the liquid hydrogen as a low-temperature heat source in the first heat exchanger, and the second circuit and the second turboexpander form a part of a second thermodynamic cycle that uses the first working medium as a low-temperature heat source in the second heat exchanger, wherein the cold energy recovery facility comprises:

a hydrogen line configured to guide the hydrogen from the liquid hydrogen tank to a supply destination;

a first hydrogen heater provided downstream of the first heat exchanger in the hydrogen line, the first hydrogen heater being configured to heat the hydrogen the hydrogen line by heat exchange with the heat medium;

a second hydrogen heater provided downstream of the first heat exchanger and upstream of the first hydrogen heater in the hydrogen line, the second hydrogen heater being configured to heat the hydrogen in the hydrogen line by heat exchange with at least some of the second working medium discharged from the second turboexpander; and a bypass line that diverges from the second circuit on a side downstream of the second turboexpander and upstream of the second heat exchanger and merges into the second circuit on a side downstream of the second heat exchanger and upstream of the third heat exchanger, and wherein the second hydrogen heater is configured to beat the hydrogen by heat exchange with the at least some of the second working medium flowing through the bypass line.

2. The cold energy recovery facility according to claim 1, wherein the second hydrogen heater is configured to condense the at least some of the second working medium by heat exchange with the hydrogen.

3. The cold energy recovery facility according to claim 1, wherein the second hydrogen heater is provided downstream of the second turboexpander and upstream of the second heat exchanger in the second circuit.

4. The cold energy recovery facility according to claim 1, further comprising:

an intermediate medium circulation line configured to circulate an intermediate medium;

a third hydrogen heater provided downstream of the second hydrogen heater and upstream of the first hydrogen heater in the hydrogen line, the third hydrogen heater being configured to heat the hydrogen by heat exchange with the intermediate medium; and an intermediate medium cooler provided on the intermediate medium circulation line, the intermediate medium cooler being configured to heat the intermediate medium by heat exchange with the heat medium.

5. The cold energy recovery facility according to claim 1, further comprising:

a working medium heater provided downstream of the second heat exchanger and upstream of the first turboexpander in the first circuit, the working medium heater being configured to heat the first working medium flowing through the first circuit.

6. The cold energy recovery facility according to claim 1, further comprising:

a first generator configured to be driven by the first turboexpander; and a second generator configured to be driven by the second turboexpander.

7. The cold energy recovery facility according to claim 1, further comprising:

a heat medium line configured to supply the heat medium to the third heat exchanger, wherein the heat medium includes a cooling fluid that has cooled a high-temperature device.

8. A marine vessel comprising:

a ship;

the cold energy recovery facility according to claim 1, the cold energy recovery facility being provided in the ship; and an engine or a fuel cell provided in the ship, the engine or the fuel cell using, as fuel, the hydrogen vaporized in the first heat exchanger.

9. A cold energy recovery facility, comprising:

a liquid hydrogen tank configured to store liquid hydrogen;

a first circuit configured to circulate a first working medium;

a second circuit configured to circulate a second working medium having a freezing point higher than the first working medium;

a first turboexpander provided in the first circuit, the first turboexpander being configured to be driven by the first working medium in a gas state, a second turboexpander provided e second circuit, the second turboexpander being configured to be driven by the second working medium in gas state;

a first heat exchanger configurer to vaporize the liquid hydrogen from the liquid hydrogen tank by heat exchange with the first working medium;

a second heat exchanger configured to vaporize the first working medium in a liquid state by heat exchange with the second working medium; and a third heat exchanger configured to vaporize the second working medium in a liquid state by heat exchange with a be medium, wherein the first circuit and the first turboexpander form a part of a first thermodynamic cycle that uses the liquid hydrogen as a low-temperature heat source in the first heat exchanger, and the second circuit and the second turboexpander form a part of a second thermodynamic cycle that uses the first working medium as a low temperature heat source in the second heat exchanger, wherein the cold energy recovery facility comprises:

a first generator configured to be driven by the first turboexpander;

a second generator configured to be driven by the second turboexpander, a third circuit forming a part of an air conditioning cycle, the third circuit being configured to circulate a third working medium; and a condenser forming a part of the air conditioning cycle, the condenser being configured to condense the third working medium flowing through the third circuit, and wherein the condenser is configured to condense the third working medium by heat exchange with the first working medium in a gas state upstream of the first turboexpander in the first circuit or the second working medium in a gas state upstream of the second turboexpander in the second circuit.

10. A marine vessel comprising:

a ship;

the cold energy recovery facility according to claim 9, the cold energy recovery facility being provided in the ship; and an engine or a fuel cell provided in the ship, the engine or the fuel cell using, as fuel, the hydrogen vaporized in the first heat exchanger.

11. A cold energy recovery facility, comprising:

a liquid hydrogen tank configured to store liquid hydrogen;

a first circuit configured to circulate a first working medium, a second circuit configured to circulate a second working medium having a freezing point higher than the first working medium;

a first turboexpander provided in the first circuit, the first turboexpander being configured to be driven by the first working medium in a gas state;

a second turboexpander provided in the second circuit, the second turboexpander being configured to be drive by the second working medium in a gas state;

a first heat exchanger configured to vaporize the liquid hydrogen from the liquid hydrogen tank by heat exchange with the first working medium;

a second heat exchanger configured to vaporize the first working medium in a liquid state by heat exchange with the second working medium; and a third heat exchanger configured to vaporize the second working medium in a liquid state by heat exchange with a heat medium, wherein the first circuit and the first turboexpander form a part of a first thermodynamic cycle that uses the liquid hydrogen as a low-temperature heat source in the first heat exchanger, the second circuit and the second turboexpander form a part of a second thermodynamic cycle that uses the first working medium as a low-temperature heat source in the second heat exchanger, the first circuit is configured to circulate an inert substance as the first working medium, and the cold energy recovery facility further includes a supply line diverging from the first circuit on an upstream side of the first turboexpander, the supply line being configured to supply the first working medium to a device, and a return line merging into the first circuit on a downstream side of the first turboexpander, the return line being configured to return the first working medium from the device to the first circuit.

12. The cold energy recovery facility according to claim 11, further comprising:

a gas transport tube as the device, the gas transport tube being configured to transport combustible gas, wherein the gas transport tube has a double tube structure including an inner peripheral pipe configured to allow the combustible gas to flow and an outer peripheral pipe provided around an outer periphery of the inner peripheral pipe, and the outer peripheral pipe is configured to be supplied with the first working medium from the supply line.

13. The cold energy recovery facility according to claim 7, wherein the high-temperature device includes a calculator.

14. A marine vessel comprising:

a ship;

the cold energy recovery facility according to claim 10, the cold energy recovery facility being provided in the ship; and an engine or a fuel cell provided in the ship, the engine or the fuel cell using, as fuel, the hydrogen vaporized in the first heat exchanger.

* * * * *